Patented Oct. 30, 1945

2,388,153

UNITED STATES PATENT OFFICE 2,388,153

CLEANING AND LUBRICATING EMULSION

Hugh H. Jones, Birmingham, Ala., assignor to Hugh Jones Products Company, a corporation of Alabama No Drawing. Application January 1, 1945, Serial No. 571,017

3 Claims. (Cl. 18—47)

This invention relates to a rubber mold cleaning and lubricating emulsion and has for an object the provision of a composition of the character designated which shall be adapted to be applied to metal molds used in molding rubber, as by spraying or painting, particularly tire molds, and which shall be effective to lubricate and clean the molds so that objectionable deposits are not formed thereon.

As is well known in the art to which my invention relates, difficulties are encountered in molding rubber, particularly rubber tires, in that a hard carbonized cake is formed on the metal molds and matrices which, unless cleared away, soon distorts the design thereof. Heretofore, it has been the practice to clean the molds and matrices with a sand blast or shot blast, or by burning the cake off the molds or matrices. Various compounds have been proposed for use in rubber molds and matrices to keep them clean, the most frequently used product being soapstone. All such compounds with which I am familiar, when subjected to the heat of the mold tend to combine with, or mix with the sulphur and other ingredients in the green rubber and form a solid carbonized cake which remains in the mold or matrix. It is accordingly the principal object of my invention to provide a composition which does not cake when subjected to the heat of the mold so that a clean mold is provided at all times. A still further object of my invention is to provide a composition of the character designated which shall have the property of causing the rubber to flow freely into the mold.

My improved composition comprises an emulsion containing an alkaline detergent and emulsifying agent such as trisodium phosphate, tetrasodium pyrophosphate, or trienthanolamine; a penetrant or wetting agent, such as sulphonated oil; and an oil having rubber solvent properties such as pine oil, together with an emulsifying agent therefor. I also preferably add a substance having the properties of a lubricant for the mold and a flux for the rubber, such as gum arabic mucilage, agar-agar jelly or gelatine. The active ingredients comprise from 8 to 19% of the mixture, the remainder being water. I have found that rubber molds may be used indefinitely without cleaning when painted with such a mixture each time before use.

Following, by way of example, is a preferred manner of making my improved compound.

|  | Per cent |
|---|---|
| Trisodium phosphate, 6 to 18 lbs | 1.3 to 4.0 |
| Turkey red oil, 3 to 5 qts | 1.2 to 2.1 |
| Mixture of pine oil and an alkali metal soap, such as sodium or potassium oleate, 1 to 3 qts | 0.4 to 1.20 |
| Gum arabic mucilage, ½ to 2 pts | .34 to 1.0 |

Water sufficient for 55 gal. of mixture.

The ingredients are mixed together with agitation, whereupon a stable emulsion is produced. It is applied to a rubber mold or matrix with a brush or by spraying each time the mold is used.

Instead of trisodium phosphate I may employ an equivalent amount, or 1½ to 4½ lbs. of tetrasodium pyrophosphate (.34 to 1.0%). The mixture of pine oil and soap mentioned above is preferably in the proportion of substantially 75% pine oil and 25% of soap. The gum arabic mucilage is made by mixing 350 grams of gum arabic and one gram of sodium benzoate with 1000 cc. of water. Instead of the gum arabic mucilage, I may employ from ½ to 2 pts. of a ½% solution of agar-agar, or the equivalent amount of gelatine.

In use, I have found that there is no residue left in the mold and that the rubber strips clean with a bright, smooth finish.

While I have described the preferred form of my invention and the manner of its use, it will be obvious to those skilled in the art that substitutions of ingredients and changes in the proportions thereof may be made, within the scope of my invention, and I desire, therefore, to be limited only by the appended claims.

What I claim is:

1. A lubricant mixture for molds used in molding rubber comprising trisodium phosphate from 1 to 4 per cent, Turkey red oil 1.2 to 2.1 per cent, a mixture of pine oil and an alkali metal water soluble soap in the proportions of approximately 3 parts pine oil to one part of soap 0.4 to 1.2 per cent, gum arabic mucilage 0.1 to 0.4 per cent and the remainder water.

2. A lubricating mixture for molds in molding rubber comprising tetra sodium pyrophosphate from 0.34 to 1.0 per cent, Turkey red oil 1.2 to 2.1 per cent, a mixture of pine oil and an alkali metal water soluble soap in the proportions of approximately 3 parts pine oil to one part of soap 0.4 to 1.2 per cent, a solution of agar-agar 0.1 to 0.4 per cent, and the remainder water.

3. A lubricating mixture for molds used in molding rubber comprising from 0.34 to 4.0 per cent of an alkaline sodium phosphate selected from the group consisting of trisodium phosphate and tetrasodium pyrophosphate, Turkey red oil from 1.2 to 2.1 per cent, a mixture of pine oil and an alkali metal water soluble soap in the proportions of approximately 3 parts pine oil to one part of soap 0.4 to 1.2 per cent, a rubber flux and lubricant selected from the group consisting of gum arabic mucilage and agar-agar 0.1 to 0.4 per cent, and the remainder water.

HUGH H. JONES.